Patented Dec. 23, 1941

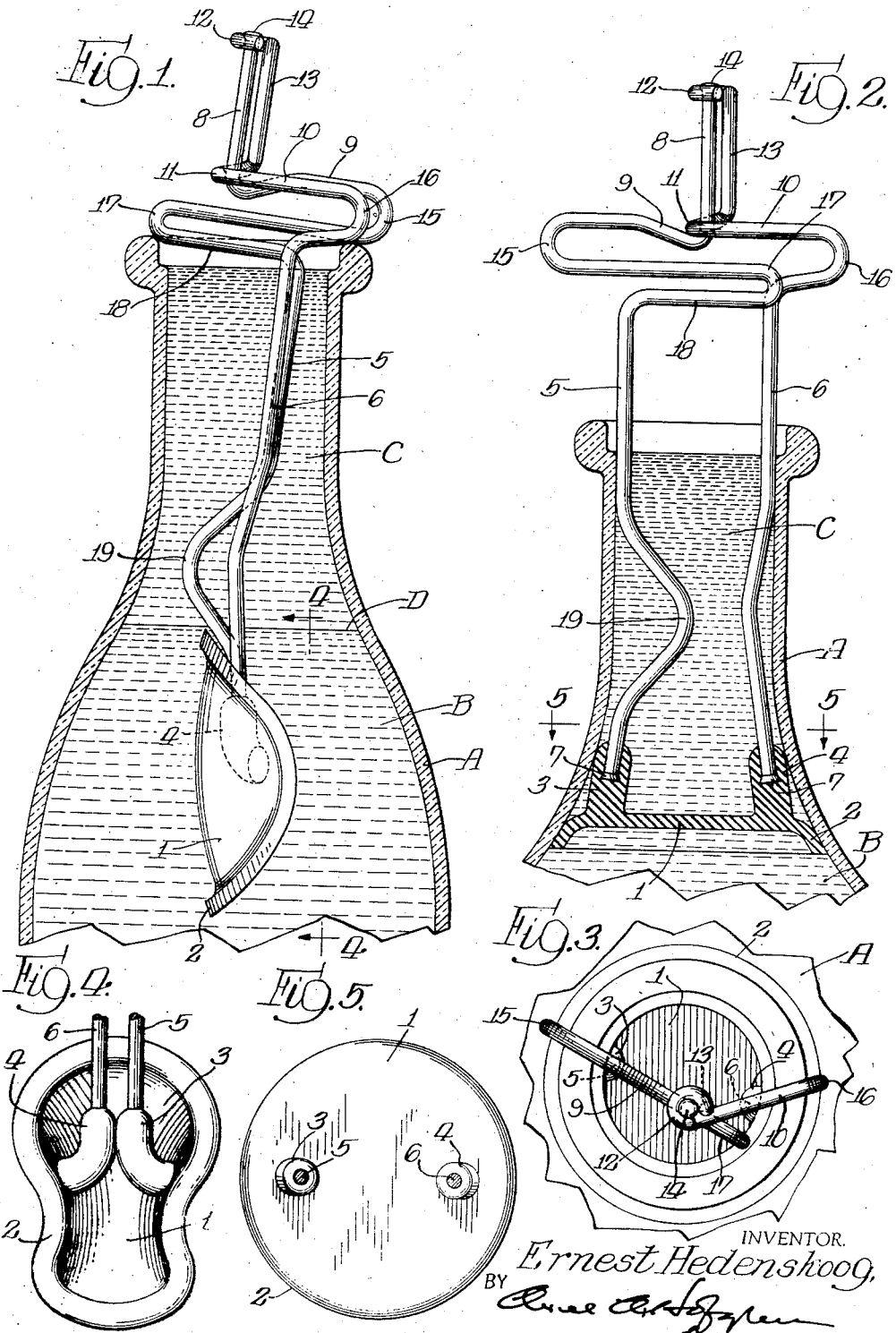

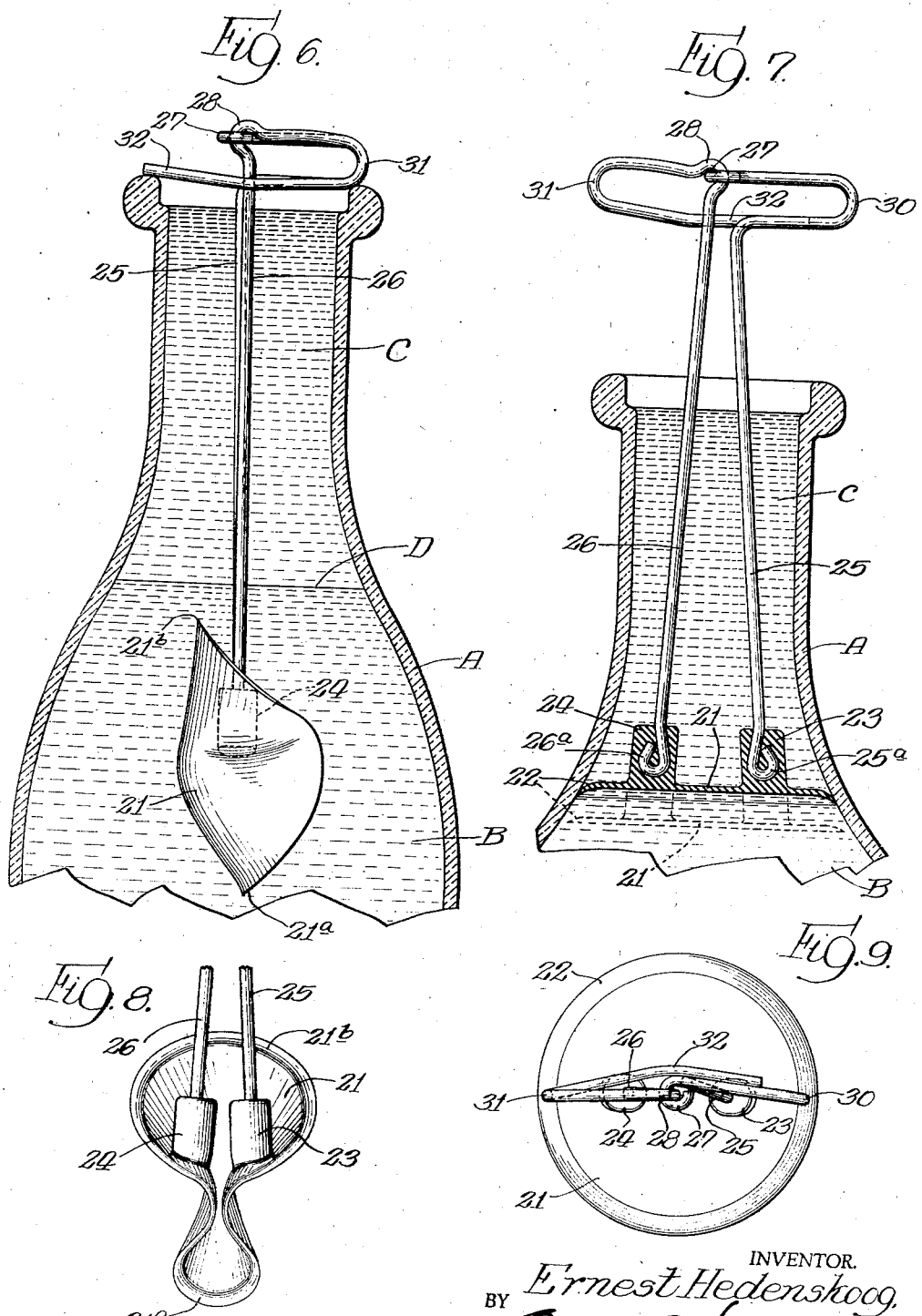

2,267,654

UNITED STATES PATENT OFFICE 2,267,654

CREAM SEPARATING DEVICE

Ernest Hedenskoog, Muskegon, Mich.

Application March 27, 1941, Serial No. 385,507

12 Claims. (Cl. 210—51.5)

This invention relates to a cream separating device designed to be introduced into the upper portion of a milk bottle and to be positioned therein to permit the cream to be poured off without releasing the milk which occupies the lower portion of the bottle.

One object of the invention is to provide a new and improved device for this purpose. Another object is to provide a structure which can be readily and thoroughly cleansed for maintaining it in a sanitary condition at all times.

A further object is to provide a mechanically simple construction which is inexpensive to manufacture and easy to adjust for use.

More specifically, it is an object of the invention to provide a flexible and resilient disk adapted to be placed horizontally in a bottle to separate the cream in the upper portion from the milk in the lower portion, and to supply said disk with control means extending exteriorly of the bottle neck and operable to flex the disk into a folded form to facilitate its insertion in the bottle, or removal therefrom.

It is also an object of the invention to provide a flexible and resilient disk with integral lugs spaced apart on its upper surface and with control members operable to rotate said lugs relatively to each other for folding the disk and tilting it to facilitate its insertion or removal.

Other objects and advantages of the invention will appear from the following description taken in conjunction with the drawings in which:

Fig. 1 is a side elevation of a cream separating device embodying this invention, showing the parts as adjusted to facilitate their insertion in a milk bottle, the bottle and its contents being shown in section and the lower portion of the bottle omitted.

Fig. 2 illustrates the device in elevation, with the parts adjusted to cream separating position, the separating disk itself and the neck portion of a milk bottle to which it is applied being shown in section.

Fig. 3 is a top plan view, showing the parts adjusted as in Fig. 2.

Fig. 4 is a detail elevation looking toward the face of the disk in its folded position, as indicated at line 4—4 on Fig. 1.

Fig. 5 is a detail plan section taken as indicated at line 5—5 on Fig. 2.

Fig. 6 is a side elevation of a modified form of the invention with the parts adjusted in position for insertion in a milk bottle, and with the bottle and its contents shown in section, as in Fig. 1.

Fig. 7 is a sectional view showing the neck of the bottle with the modified device extended therein in position for separating the cream from the milk.

Fig. 8 is a top plan view of the separating device with the parts adjusted as shown in Fig. 6.

Fig. 9 is a top plan view of the device with the parts adjusted as in Fig. 7.

While there are shown in the drawings and described herein two forms of the invention, it is to be understood that the invention is not limited to the specific forms or structures herein disclosed, but that it is the intention to cover all modifications and alternative constructions falling within the spirit and scope of the invention as expressed in the appended claims.

In a bottle of milk as delivered to the consumer, or after it has been allowed to stand for a short time, the cream usually occupies the neck or uppermost portion of the bottle. In Fig. 1 the bottle A is indicated as containing milk at B and cream at C, with a fairly definite plane of separation or "cream-line" at D. Many consumers prefer to remove the cream for use separately from the milk, and the present invention provides means for doing this easily and efficiently.

The device includes a disk or valve member 1 which is preferably made of flexible resilient material such as rubber, formed with its peripheral portion curved downwardly as seen at 2, so as to fit snugly against the upwardly tapering wall of the bottle at the cream-line D, when the disk is disposed transversely therein, as shown in Fig. 2. The flexibility of the material will cause the edge of the disk to accommodate itself to any slight irregularities in the contour of the bottle wall so as to provide an effective seal between the milk at B and the cream at C. The disk 1 is formed with a pair of integral lugs 3 and 4 projecting from its upper face and spaced apart thereon substantially along the diameter, and preferably at about equal distances from the center of the disk; and for manipulating and adjusting the disk to introduce it or remove it from the bottle there is provided a pair of control members 5 and 6 each firmly attached to one of said lugs. As shown, these members are in the nature of rods formed of metallic wire stock, and each of them is made with a slightly enlarged terminal 7 anchored in one of the lugs 3, 4. When the disk is molded, the lugs 3, 4 may be formed with bores somewhat smaller than the diameter of the wire stock of which the rods 5 and 6 are made, so that when the ends of the rods are forced into these bores the resilient material of the lugs will be stretched to fit around the enlargements 7, and the rubber will hug the surfaces of the rods, thus forming a tightly sealed junction therewith. If desired, this attachment may be further strengthened by the so-called method of "welding" or vulcanizing the rubber of the lugs 3 and 4 to the metallic links 5 and 6. In either case the connection is so tightly sealed that it will exclude and prevent lodgment of dirt or other matter which would render the device unsanitary; and the smoothly rounded contours of the disk and its lugs, and of the round wire stock of which the control members are formed, makes the structure easy to cleanse and rinse thoroughly. While the rods 5 and 6 are of heavy enough stock to be comparatively rigid, the lugs 3 and 4 provide flexible connections between the rods and the disk 1.

The upper end portion of the rod 5 is a stem 8 whose axis is in substantial alignment with the center of the disk 1. Extending transversely from the stem 8 is an arm portion 9, and the part of the rod 5 which engages the disk 1 is connected with the arm 9 by an intermediate integral portion, bent as shown in Fig. 2, somewhat in the form of a letter S. The other rod 6 includes near its upper end a transverse arm 10 and a terminal portion which is formed with a pair of loops or eyes 11 and 12 spaced apart by a connecting portion 13, and both encompassing the stem 8 of the rod 5. The engagement of the eyes 11 and 12 with the stem 8 thus provides a turnable connecting means or hinge by which the control rods 5 and 6 are connected for swinging about the axis of the stem 8, which is approximately aligned with the center of the disk 1. The upper end of the stem 8 may be slightly enlarged or swaged over at 14 to hold the hinged elements in assembled relation.

When the arms 9 and 10 are manually folded or swung toward each other about this axis of the stem 8, the parallel portions of the rods 5 and 6, and also the lower end portions thereof at 7, 7, are swung toward each other, carrying with them the lugs 3, 4, and forcing the disk 1 to fold substantially about its diameter at right angles to the line connecting the lugs 3 and 4. But since this swinging movement of the arms 9 and 10 turns each of the rods 5 and 6 through about 90 degrees, the lower ends of these rods, being quite firmly anchored in the lugs 3 and 4, operate to twist the flexible portions of the lugs extending between the disk 1 and the ends of the rods 5 and 6. And the effect of this twisting action is to tilt the disk 1 from it normally horizontal position into a vertically extending position, as shown in Fig. 1, the lugs themselves responding to the folding of the disk by bending, as indicated in Fig. 4, while, at the same time, experiencing the torque produced by the partial rotation of the rods 5 and 6. The stresses thus set up in the resilient material of the disk 1 and its lugs 3 and 4 tend to return the disk to its normal flat form and to unfold the arms 9 and 10 immediately upon release of the manual effort by which they are held in folded relation. The disk may then be adjusted to the exact level of the cream-line and into contact with the wall of the bottle A, as seen in Fig. 2.

The effective radial length of the arms 9 and 10 in relation to the parallel portions of rods 5 and 6 is such that when the arms unfold about their hinge axis they encounter the inner surface of the neck of the bottle before reaching their limit of unfolding movement. The stress exerted by the resilient lugs 3 and 4 thus forces the rods 5 and 6 into frictional contact with the bottle neck, serving to hold the device at the adjusted level without manual support, so that the hands are left free for tipping the bottle and pouring the cream C therefrom. When this has been accomplished the resilient disk 1 is again collapsed or folded into the form shown in Fig. 1 to permit removal of the device from the bottle.

In the form of the device shown in Figs. 1 to 5, the arms 9 and 10 are provided with convenient handle portions or finger grips by extending these arms laterally beyond the axes of the parallel portions of rods 5 and 6, and then bending the material back upon itself at 15 and 16. From the bend 16 the material joins the vertical portion of rod 6, but the rod 5 includes an additional bend 17 which provides an arm 18 extending in the opposite direction to the arm 9 to act as a stop of sufficient lateral extent to prevent the device from falling too far into the milk bottle when in collapsed or folded condition. This function of the arm 18 is indicated in Fig. 1.

It will be readily understood that in handling the device for entering it in the bottle neck the user may grasp the stem portion 8 between the thumb and finger of one hand, using the thumb and finger of the other hand to press together the bent portions 15 and 16 to fold the arms 9 and 10 toward each other for collapsing the disk 1 into folded position. After lowering the disk into the bottle the arms 9 and 10 are allowed to unfold, and the fingers are removed from the bent handle portions 15, 16, while the stem 8, still grasped between the fingers of the other hand, is used to adjust the flattened disk 1 to sealing position in the bottle neck. But, if desired, the device can be manipulated entirely by the fingers of one hand engaging the bent portions 15, 16; and this is facilitated by virtue of the fact that the bend 17 at the end of the arm 18 is located so as to engage against the rod 6 and thus limit the unfolding of arms 9 and 10 at a position at which they form an obtuse angle. The pressure of the thumb and finger of one hand, applied at 15 and 16, automatically folds the arms 9 and 10 for collapsing the disk 1, and with this grip upon the portions 15, 16 the operator can readily lift the device and place it in the bottle with one hand alone.

Whether the device is manipulated by one hand or by both, it will hold itself positioned in the bottle when the finger pressure at 15 and 16 is relaxed, because the torsional resilience of lugs 3 and 4 will urge the parallel portions of the rods 5 and 6 outwardly into frictional engagement with the inner surface of the bottle neck, pressing against this surface with sufficient force to hold the device in place but not so strongly as to prevent it being slidably shifted to bring the disk 1 to the cream-line at D. Then after the cream has been poured off, the device is again folded and removed from the bottle. As shown in Figs. 1 and 2, the portion of the rod 5 adjacent the disk 1 is formed with a bend 19 which overhangs the edge of the disk when the latter is folded and tilted, as in Fig. 1; the bent portion 19 of the rod acts as a guard to prevent the upper edge of the disk from catching against the wall of the bottle neck as the device is being withdrawn after use.

If the lugs 3 and 4 of the disk 1 are not "welded" onto the terminals 7, 7 of the rods 5 and 6, the disk 1 may be readily detached for replacement if it should become worn or damaged, and a new disk may be as readily applied by simply forcing the terminals of the rods into the openings in the ends of the lugs 3 and 4 of the new disk.

In the construction shown in Figs. 6 to 9 the flexible and resilient disk 21 is made somewhat thinner and more flexible than the disk 1 of the structure already described. Its marginal portion 22 is formed with a tapered or "feather" edge so as to fit snugly in contact with the inner surface of the bottle A, and it is formed with integral lugs 23 and 24 in which the control rods 25 and 26 are respectively anchored. The lower terminals of the rods are shown as bent into flat eyes 25ª and 26ª which may be set in the mold in which the disk and its lugs are formed, so that the rubber will seal itself around the rod terminals and will extend through the eyes 25ª and 26ª, insuring a positive engagement by which rotation of either of the rods will turn or rotate the lug in which its terminal is thus embedded.

The upper end portions of the control rods 25 and 26 are connected together by the provision of a closed eye 27 on the rod 25, linked with a U-shaped bend 28 in the rod 26, forming a more or less universal coupling. As seen in Fig. 7, the rods converge upwardly, and their connection at the eye 27 is substantially at the point in which the axes of the two rods intersect. This arrangement makes either rod turnable substantially about its own axis and relatively to the other rod, and such rotation of either rod acts to turn the connected lug of the disk 21 and thus to swing the area of the disk adjacent the lug out of its normal position. As this area is swung toward the corresponding area adjacent the other lug, the intermediate area and rim portion of the disk are forced to buckle downwardly at one side, as indicated at 21ª in Fig. 8, while the rim at the opposite side of the disk is tensioned and forced upwardly from its normal plane, as at 21ᵇ, so that the disk, as a whole, is folded substantially along the middle of its width, and, at the same time, is tilted into an inclined position, as seen in Figs. 6 and 8.

The rotation of either or both of the rods 25 and 26 relatively to each other is facilitated by providing handle portions 30 and 31 extending laterally in opposite directions from the rods, and each comprising a portion of the rod stock doubled upon itself and extending approximately at right angles to the shank portions 25 and 26. The material of the handle 31 includes an extension 32 disposed for encounter with the handle portion 30 when the rods 25 and 26 stand at initial position with the disk 21 in its normal flat form, as seen in Fig. 7. At this initial position, as indicated in Fig. 9, the handles 30 and 31 are slightly out of alignment and are thus predisposed to rotation toward each other for folding together, as seen in Fig. 6; and the stop 32 serves to prevent folding of the arms in the opposite direction. In other words, the initial angular position of the arms 30 and 31 is such that they may be manipulated very simply by merely pinching their rounded ends between the thumb and finger of one hand for folding them, and thus causing the buckling and folding and tilting of the disk 21 to the position illustrated in Fig. 6.

Although the relative rotation of the control rods 25 and 26 is sufficient to produce the folding and tilting effect, the folding of the disk naturally tends to move the lugs 23 and 24 bodily toward each other, and this is permitted by the fact that the rods 25 and 26 are connected hingedly by the engagement of the eye 27 and loop 28 so that they are free to swing toward each other at their lower ends, and thus permit the lugs 23 and 24 to approach as closely as the folding of the disk 21 tends to bring them. Incidentally, it may be noted that when a relatively thin and flexible disk 21 is employed, as in this form of the device, the area of the disk adjacent the lugs 23 and 24 flexes rather sharply in accommodation to the folding action without causing substantial bending of the lugs, whereas with a thicker disk such bending will occur, as shown in Fig. 4.

It has also been found that with a relatively thin and flexible disk it is not necessary to form the control rods 25 and 26 so as to cause them to engage the neck of the bottle frictionally for holding the device in place. As shown in Fig. 7, the disk is of substantially uniform thickness, except at the marginal portion 22, which is tapered by rounding off the upper face so that this surface meets the flat lower face of the disk in a substantially sharp or "feather" edge. The normal form of the disk is indicated in dotted outline in Fig. 7, but when it is drawn up into the position shown in full lines, with its tapered marginal portion 22 in contact with the glass wall of the bottle, the easy flexure of the thinned margin causes this portion of the disk to adhere quite firmly to the wall of the bottle, thus holding the device reliably in position while the bottle is tilted for pouring off the cream from the space above the disk. To avoid the possible splashing of the milk which might occur if the disk were forcibly disengaged from the wall of the bottle after removal of the cream, it is preferable to again fold the disk by swinging the transverse arms of the control rods about their pivotal connection. Then the disk may be immersed once or twice in the milk to rinse off any cream adhering to it, after which it may be withdrawn from the neck of the bottle in folded form and then allowed to resume its normal shape.

I claim as my invention:

1. A device of the character described comprising in combination a disk of flexible resilient material adapted to be placed horizontally in a bottle to separate the liquid in the upper portion thereof and to be folded and tilted to facilitate passage through the neck of the bottle, and means for handling said disk comprising a pair of control rods extending from one side of said disk and having terminal portions anchored non-rotatably to the disk at points spaced apart thereon, stop means on the rods preventing their relative longitudinal movement, and means operable to turn one of said rods relatively to the other, thus rotating the portion of the disk to which the rod is anchored and causing the disk simultaneously to fold and tilt.

2. A device of the character described comprising in combination a disk of flexible resilient material adapted to be placed horizontally in a bottle to separate the liquid in the upper portion thereof and to be folded and tilted to facilitate passage through the neck of the bottle, said disk having a pair of integral lugs extending from one face thereof at spaced points on opposite sides of the center of the disk, and means for handling said disk comprising a pair of control members having terminal portions sealed non-rotatably in said lugs respectively, extending therefrom to pass through the neck of the bottle, and operable to turn one of said lugs relatively to the other, thus rotating the adjacent portion of the disk, causing the disk simultaneously to buckle and fold and to tilt.

3. A device of the character described comprising in combination a disk of flexible resilient material adapted to be placed horizontally in a bottle to separate the liquid in the upper portion thereof and to be folded and tilted to facilitate passage through the neck of the bottle, said disk having a pair of integral lugs extending from one face thereof at spaced points on opposite sides of the center of the disk, and means for handling said disk comprising a pair of control members having terminal portions anchored non-rotatably in said lugs and extending therefrom to pass through the neck of the bottle and means turnably connecting the opposite terminal portions of the control members and operable to turn the control members in opposite directions to twist said lugs, simultaneously causing to move the first mentioned terminal portions toward each other and thereby fold and tilt the disk.

4. A device of the character described comprising in combination a disk of flexible resilient material adapted to be placed horizontally in a bottle to separate the liquid in the upper portion thereof and to be folded and tilted to facilitate passage through the neck of the bottle, and means for handling said disk comprising a pair of control rods extending from one side of said disk and having terminal portions anchored non-rotatably to the disk at points spaced apart thereon, and means turnably connecting the opposite terminal portions of said control rods and operable to turn said control rods in opposite directions, simultaneously causing the first mentioned terminal portions thereof to move towards each other to tilt and fold the disk.

5. A device for the purpose indicated, comprising a disk of flexible resilient material adapted to be folded and tilted to facilitate passage through the neck of the bottle, and means for handling said disk comprising a pair of control members having terminal portions attached to one face of the disk at spaced points thereon, said members having approximately parallel portions arranged to extend through the neck of the bottle and having transversely extending and converging arms fixed thereto remote from the disk, and means turnably connecting said arms to swing on an axis spaced substantially equally from and parallel to said parallel portions of the control members and operable to swing the arms about said axis to move the terminal portions of said members toward each other and to turn said terminal portions in opposite directions to fold and tilt said disk for inspection through a bottle neck, the resilient material then reacting to separate said arms and press the parallel portions of the members against the wall of the bottle neck in which the device is entered.

6. In a device for the purpose indicated, as defined in claim 5, stop means on said members limiting the separating movement of said arms at a position at which the arms form an obtuse angle.

7. A device for the purpose indicated, comprising a disk of flexible resilient material adapted to be folded and tilted to facilitate passage through the neck of the bottle, said disk having a pair of integral lugs projecting from one face thereof and spaced apart thereon on opposite sides of the center of the disk, and means for handling said disk comprising a pair of control rods having their terminal portions anchored fixedly in said lugs respectively, said rods extending from the disk in approximately the same direction and having transversely extending and converging arms remote from the disk and means turnably connecting said arms to swing on an axis passing substantially through the center of the disk and operable to swing the arms towards each other and thereby move the terminal portions of the rods towards each other to fold the disk and simultaneously twist said lugs in opposite directions to tilt the disk in approximate alignment with the rods.

8. A device for the purpose indicated, comprising a disk of flexible resilient material adapted to be folded and tilted to facilitate passage through the neck of the bottle, and means for handling said disk comprising a pair of control rods having their terminal portions attached to one face of the disk at spaced points thereon, said rods extending from the disk in approximately the same direction and having transversely extending and converging arms remote from the disk, means turnably connecting said arms together on an axis substantially parallel to and spaced equally from said rods and operable to swing said arms together, thereby bringing the terminal portions of the rods together to fold the disk and turning the rods in opposite directions to tilt the disk into approximate alignment with the rods, one of said rods having a transversely bent portion disposed adjacent the upper edge of the disk in its tilted position and extending laterally as a guard for the disk during its removal through the bottle neck.

9. A device for the purpose indicated, comprising a disk of flexible resilient material adapted to be folded and tilted to facilitate passage through the neck of a bottle and means for handling said disk comprising a pair of control members having terminal portions attached and sealed to one face of the disk at spaced points thereon, said members extending from the disk in approximately the same direction and having transversely extending and converging arms remote from the disk, means turnably connecting said arms together on an axis substantially in alignment with the center of the disk and including means preventing relative longitudinal movement between said members, said arms having extensions projecting laterally outwardly from said members to serve as finger-pieces by which said arms may be turned to thereby swing the terminal portions of said members towards each other to fold the disk and to turn said terminal portions in opposite directions to tilt the disk into approximate alignment with said members.

10. A device of the character described comprising, in combination, a disk of flexible resilient material having a pair of integral lugs extending from one face thereof in spaced relation and means for handling said disk comprising a pair of wire members having substantially parallel portions extending from said disk and having terminal portions at one end anchored in said lugs, said members having outwardly extending bends remote from the disk forming finger-pieces, portions converging from said bends to form arms extending to a point approximately over the center of said disk, and parallel and closely adjacent portions bent upwardly at the inner ends of said converging portions, one member having a pair of eyes spaced apart on said last mentioned parallel portion and which surround the adjacent parallel portion of the other member to form a turnable connection therebetween and one of said members having a bend forming an arm extending towards and engaging the first mentioned parallel portion of the other member to limit the turning movement between the members in one direction.

11. A device for the purpose indicated, comprising a disk of flexible resilient material adapted to be folded and tilted to facilitate passage through the neck of the bottle, said disk having a pair of integral lugs projecting from one face thereof and spaced apart thereon on opposite sides of the center of the disk, and means for handling said disk comprising a pair of control rods having their terminal portions anchored fixedly in said lugs respectively, and a pair of interengaged eyes formed on said rods respectively at a distance from the disk, one of said eyes providing a bearing at which either rod is turnable relatively to the other in a direction to turn the lug in which the rod is anchored, thus causing the disk simultaneously to fold and tilt, and the other eye acting as a stop to prevent relative longitudinal movement of the rods.

12. A device for the purpose indicated, comprising a disk of flexible resilient material adapted to be folded and tilted to facilitate passage through the neck of the bottle, said disk having a pair of integral lugs projecting from one face thereof and spaced apart thereon on opposite sides of the center of the disk, and means for handling said disk comprising a pair of control rods having their terminal portions anchored fixedly in said lugs respectively, and a universal joint connecting said rods at a distance from the disk so that either rod is turnable relatively to the other in a direction to turn the lug in which the rod is anchored, thus causing the disk simultaneously to fold and tilt and permitting the rods to swing toward each other as the disk folds, said universal joint including means which prevent relative longitudinal movement of the rods.

ERNEST HEDENSKOOG.